(12) United States Patent
Hai et al.

(10) Patent No.: US 10,838,221 B2
(45) Date of Patent: Nov. 17, 2020

(54) COLLIMATING STRUCTURE, METHOD FOR FABRICATING THE SAME AND DISPLAY DEVICE

(71) Applicant: BOE Technology Group Co., Ltd., Beijing (CN)

(72) Inventors: Xiaoquan Hai, Beijing (CN); Xue Dong, Beijing (CN); Haisheng Wang, Beijing (CN); Yingming Liu, Beijing (CN); Lei Wang, Beijing (CN); Rui Xu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 78 days.

(21) Appl. No.: 16/182,937

(22) Filed: Nov. 7, 2018

(65) Prior Publication Data

US 2019/0243154 A1 Aug. 8, 2019

(30) Foreign Application Priority Data

Feb. 5, 2018 (CN) .......................... 2018 1 0113825

(51) Int. Cl.
*G02B 27/30* (2006.01)
*G06K 9/00* (2006.01)

(52) U.S. Cl.
CPC ........... *G02B 27/30* (2013.01); *G06K 9/0004* (2013.01); *G06K 9/00046* (2013.01)

(58) Field of Classification Search
CPC ... G02B 27/30; G06K 9/0004; G06K 9/00046

(Continued)

(56) References Cited

U.S. PATENT DOCUMENTS

| | | | |
|---|---|---|---|
| 2003/0130759 A1* | 7/2003 | Kesil | ...................... B25J 9/1633 700/190 |
| 2007/0125971 A1* | 6/2007 | Wimberger-Friedl | ...................... G02B 6/0006 250/505.1 |

(Continued)

FOREIGN PATENT DOCUMENTS

| | | | |
|---|---|---|---|
| CN | 105093659 | * 11/2015 | ....... G02F 1/133512 |
| CN | 1068886341 A | 6/2017 | |

(Continued)

OTHER PUBLICATIONS

Chinese Office Action dated Dec. 26, 2019 in related Chinese Application No. 201810113825.2.

*Primary Examiner* — Prabodh M Dharia
(74) *Attorney, Agent, or Firm* — Arent Fox LLP; Michael Fainberg (57) ABSTRACT

A collimating structure, a method for fabricating the same and a display device are provided. The collimating structure includes a plurality of light-shielding layers with light-transmitting parts, and the distances between the respective light-shielding layers are adjusted using light-transmitting layers to thereby achieve a desirable depth-to-width ratio of a column of holes so as to define a light convergence angle of the collimating structure. At least one intermediate light-shielding layer is arranged between the top light-shielding layer and the bottom light-shielding layer, and the distances between the respective light-shielding layers are adjusted using the light-transmitting layers, so that crosstalk between light of the light-transmitting parts can be shielded to thereby improve the accuracy of recognized information about texture.

15 Claims, 6 Drawing Sheets

(58) Field of Classification Search
USPC .......... 345/156; 700/190; 250/363.06, 505.1
See application file for complete search history.

(56) References Cited

U.S. PATENT DOCUMENTS

| | | | |
|---|---|---|---|
| 2009/0166541 A1* | 7/2009 | Tsuchiya | G01T 1/1648 |
| | | | 250/363.05 |
| 2011/0157585 A1* | 6/2011 | Shibayama | G01J 3/02 |
| | | | 356/300 |
| 2016/0103373 A1* | 4/2016 | Xi | G02F 1/134336 |
| | | | 349/37 |
| 2016/0116752 A1* | 4/2016 | Wu | G02B 27/0093 |
| | | | 359/462 |
| 2016/0268491 A1* | 9/2016 | Wu | H01L 22/20 |
| 2017/0169273 A1 | 6/2017 | Wu | |
| 2017/0220844 A1* | 8/2017 | Jones | G06K 9/0053 |
| 2017/0261823 A1* | 9/2017 | Wang | H01L 27/1262 |
| 2018/0039849 A1* | 2/2018 | You | G06K 9/46 |
| 2018/0268190 A1* | 9/2018 | Chung | G06K 9/00013 |
| 2018/0270403 A1* | 9/2018 | Chung | H04N 5/2253 |
| 2018/0349673 A1* | 12/2018 | Lin | G06K 9/00046 |
| 2019/0056613 A1* | 2/2019 | Wang | G02F 1/13318 |
| 2019/0147206 A1* | 5/2019 | Nakata | G11B 7/0065 |
| | | | 235/451 |
| 2019/0172887 A1* | 6/2019 | Sun | H01L 27/3258 |
| 2019/0272408 A1* | 9/2019 | Ding | G06K 9/0008 |
| 2020/0212135 A1* | 7/2020 | Zhang | H01L 27/3225 |

FOREIGN PATENT DOCUMENTS

| | | |
|---|---|---|
| CN | 206657365 U | 11/2017 |
| CN | 107423728 A | 12/2017 |

* cited by examiner

COLLIMATING STRUCTURE, METHOD FOR FABRICATING THE SAME AND DISPLAY DEVICE

CROSS-REFERENCES TO RELATED APPLICATIONS

This application claims priority to Chinese patent application No. 201810113825.2 filed on Feb. 5, 2018, which is incorporated herein by reference in its entirety.

FIELD

The present disclosure relates to the field of display technologies, and particularly to a collimating structure, a method for fabricating the same and a display device.

BACKGROUND

During the acquisition of an optical image, when the distance between an object and an optical sensor structure is too large, the acquired image may be blurred, and there may be crosstalk between light of the object for which the image is acquired, thus failing to acquire a clear image of the object as a result.

SUMMARY

In an aspect, an embodiment of the disclosure provides a collimating structure. The collimating structure includes: a plurality of light-shielding layers and a plurality of light-transmitting layers stacked, and at least one of the light-shielding layer is arranged between every two of the light-transmitting layers; wherein the light-shielding layer comprises a plurality of light-transmitting parts and a plurality of light-shielding parts, and the plurality of light-transmitting parts in each light-shielding layer correspond to the light-transmitting parts in other light-shielding layers in one-to-one manner, and orthographic projections of the light-transmitting parts in each light-shielding layer onto at least one light-transmitting layer overlap with orthographic projections of the light-transmitting parts in other light-shielding layers onto the at least one light-transmitting layer; and the light-shielding layers comprises: a top light-shielding layer, a bottom light-shielding layer, and at least one intermediate light-shielding layer located between the top light-shielding layer and the bottom light-shielding layer; the top light-shielding layer and the bottom light-shielding layer are configured to define a light convergence angle of the collimating structure; and the intermediate light-shielding layer is configured to shield crosstalk between light of the plurality of the light-transmitting parts.

In some embodiments, in the collimating structure above according to the embodiment of the disclosure, the light-transmitting parts are light-transmitting holes.

In some embodiments, in the collimating structure above according to the embodiment of the disclosure, the light-transmitting parts are light-transmitting holes filled with a light-transmitting material.

In some embodiments, in the collimating structure above according to the embodiment of the disclosure, all the light-transmitting layers are located between the top light-shielding layer and the bottom light-shielding layer.

In some embodiments, in the collimating structure above according to the embodiment of the disclosure, the light-transmitting layer includes: a first light-transmitting material layer, and a second light-transmitting material layer located between the first light-transmitting material layer and one of the light-shielding layers adjacent to a side of the first light-transmitting material facing the top light-shielding layer.

In some embodiments, in the collimating structure above according to the embodiment of the disclosure, the first light-transmitting material layer is partially filled in the light-transmitting holes to form the light-transmitting parts.

In some embodiments, in the collimating structure above according to the embodiment of the disclosure, the light-transmitting layer further includes: a third light-transmitting material layer located between the first light-transmitting material layer and one of the light-shielding layers adjacent to a side of the first light-transmitting material layer facing the bottom light-shielding layer; and the third light-transmitting material layer is partially filled in the light-transmitting holes to form the light-transmitting parts.

In some embodiments, in the collimating structure above according to the embodiment of the disclosure, thicknesses of the plurality of light-transmitting layers are different.

In some embodiments, in the collimating structure above according to the embodiment of the disclosure, thicknesses of the plurality of light-shielding layers are the same.

In some embodiments, in the collimating structure above according to the embodiment of the disclosure, the light-transmitting parts in the light-shielding layers are arranged periodically, and the smaller the periodicity of the light-transmitting parts is, the larger the number of the light-shielding layers is.

In some embodiments, in the collimating structure above according to the embodiment of the disclosure, the smaller the diameter of the light-transmitting parts is, the smaller the thickness of the collimating structure is.

In some embodiments, in the collimating structure above according to the embodiment of the disclosure, a thickness of the collimating structure is smaller than or equal to 100 μm.

In some embodiments, in the collimating structure above according to the embodiment of the disclosure, the number of intermediate light-shielding layers is more than or equal to two.

In some embodiments, in the collimating structure above according to the embodiment of the disclosure, the light-shielding layers and the light-shielding layers satisfy the equations of:

$$\tan\frac{\theta}{2} = d/H;$$

$$\sum_{i=1}^{n} h_i \le \frac{(p-d)+(n-1)p}{np} *(H-h)-(n-1)h; \text{ and}$$

$$(N+1)h + \sum_{i=1}^{N} h_i = H;$$

wherein θ represents the light convergence angle of the collimating structure; d represents a diameter of each of the light-transmitting parts; p represents a periodicity of the light-transmitting parts; H represents a thickness from an outside surface of the top light-shielding layer to an outside surface of the bottom light-shielding layer; h represents a thickness of each of the light-shielding layers; and $h_i$ represents a thickness of the light-transmitting layer, i=1, ..., N, and the light-transmitting layer with smaller i is closer to the top light-shielding layer.

In some embodiments, in the collimating structure above according to the embodiment of the disclosure, the orthographic projections of the plurality of light-transmitting parts in each of the light-shielding layer onto at least one light-transmitting layer fully overlap with the orthographic projections of the plurality of light-transmitting parts in other light-shielding layers onto at least one light-transmitting layer.

In another aspect, an embodiment of the disclosure further provides a display device. The display device includes: the collimating structure above according to the embodiment of the disclosure, a display panel, and an optical sensor structure. The collimating structure is arranged at a surface of the display panel away from a display surface thereof; and the optical sensor structure is arranged at a surface of the collimating structure away from the display panel.

In some embodiments, in the display panel above according to the embodiment of the disclosure, the collimating structure is configured, when a finger touches the display surface of the display panel, to collimate light reflected by the finger through the light-transmitting parts in the light-shielding layers and the light-transmitting layers; and the optical sensor structure is configured to receive the light collimated by the collimating structure to recognize fingerprint.

In some embodiments, in the display panel above according to the embodiment of the disclosure, the optical sensor structure includes a plurality of optical sensors corresponding to the plurality of light-transmitting parts in one-to-one manner.

In another aspect, an embodiment of the disclosure further provides a method for fabricating a collimating structure. The method includes: forming a plurality of light-shielding layers with light-transmitting parts and light-shielding parts and a plurality of light-transmitting layers alternately on a base substrate, wherein at least one of the light-shielding layers is formed between every two of the light-transmitting layers, and forming each of the light-transmitting layers includes: forming a first light-transmitting material layer and a second light-transmitting material layer sequentially.

In some embodiments, in the fabricating method above according to the embodiment of the disclosure, forming the light-transmitting layer further includes: forming a third light-transmitting material layer before forming the first light-transmitting material layer.

DETAILED DESCRIPTION

Figure 1:
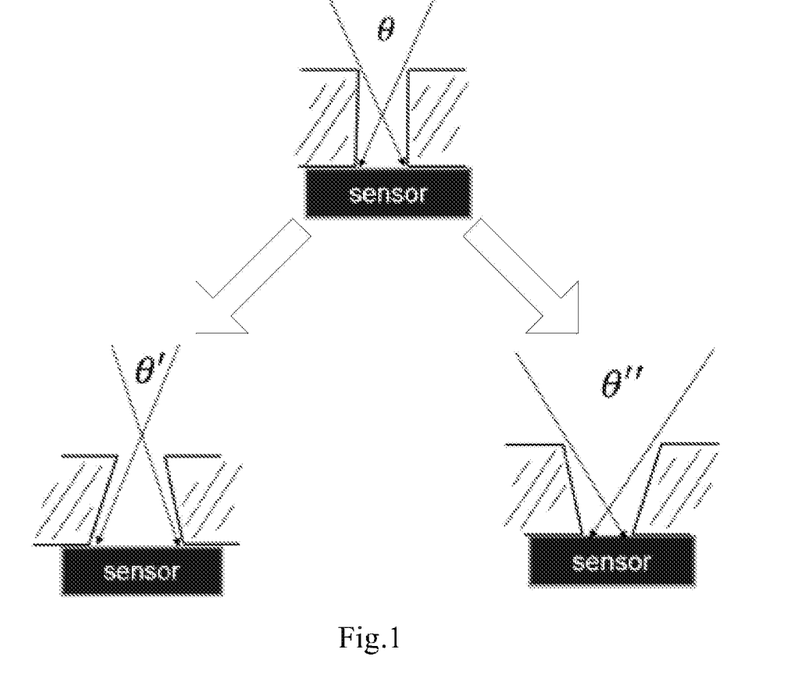
FIG. 1 is a schematic structural diagram of filtering light using a through-hole in the related art.

During a texture is being recognized optically, when the distance between a finger and a sensor is too large, then light reflected by the finger may be diffused so that an acquired image may be blurred, and thus information about the fingerprint may be recognized inaccurately using the light received by the sensor. In order to acquire information about a valley and a ridge of the texture precisely, a collimating structure is generally added to the sensor in a through-hole filter scheme and a lens plus diaphragm scheme. There may be such a high depth-to-width ratio of the through-hole structure made of a specific material that as illustrated in FIG. 1, there may be such a cornered structure in the related photolithograph process that sidewalls of the through-hole structure may not be exactly perpendicular to a light incidence face, so that there is such a larger light convergence angle that there may be crosstalk between information about light rays of adjacent valleys and ridges, so information about the recognized line may be recognized inaccurately, and thus the acquired image may be blurred. In the lens plus diaphragm scheme, there is a large thickness of the device as a whole. Both of the two structures above suffer from high process difficulty, a large thickness of the device as a whole, etc.

In view of the problems above, embodiments of the disclosure provide a collimating structure, a method for fabricating the same and a display device. In order to make the objects, technical solutions, and advantages of the disclosure more apparent, the disclosure will be described below in further details with reference to the drawings, and apparently the embodiments described below are only a part but not all of the embodiments of the disclosure. Based upon the embodiments here of the disclosure, all the other embodiments which can occur to those ordinarily skilled in the art without any inventive effort shall fall into the scope of the disclosure.

The shapes and sizes of respective components in the drawings are not intended to reflect any real proportion, but only intended to illustrate the content of the disclosure.

Figure 2:
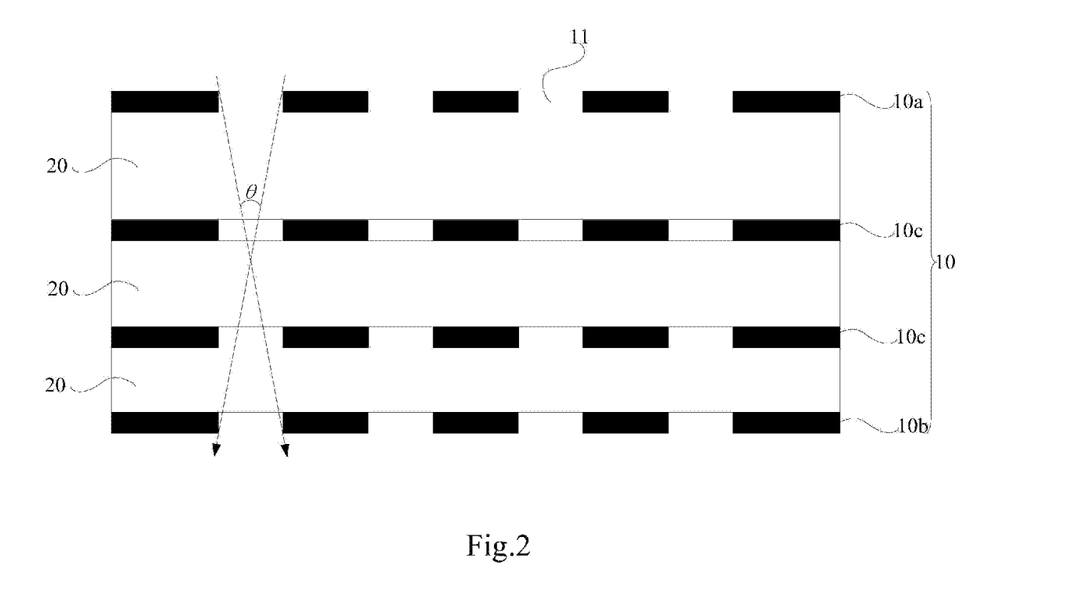
FIG. 2 is a first schematic structural diagram of a collimating structure according to an embodiment of the disclosure.

An embodiment of the disclosure provides a collimating structure, as illustrated in FIG. 2, the collimating structure includes: a plurality of light-shielding layers 10 and a plurality of light-transmitting layers 20 stacked, wherein at least one of the light-shielding layers 10 is arranged between every two of the light-transmitting layers 20.

The light-shielding layer includes a plurality of light-transmitting parts 11 and a plurality of light-shielding parts, and the light-transmitting parts 11 in each light-shielding layer 10 correspond to the light-transmitting parts 11 in another light-shielding layer in a one-to-one manner, and the orthographic projections of the light-transmitting parts 11 in each light-shielding layer 10 onto at least one light-transmitting layer 20 overlap with the orthographic projections of the light-transmitting parts 11 in other light-shielding layers 10 onto the at least one light-transmitting layer 20.

The light-shielding layers 10 includes: a top light-shielding layer 10a, a bottom light-shielding layer 10b, and at least one intermediate light-shielding layer 10c located between the top light-shielding layer 10a and the bottom light-shielding layer 10b. The top light-shielding layer 10a and the bottom light-shielding layer 10b are configured to define a light convergence angle θ of the collimating structure; and the intermediate light-shielding layer 10c is configured to shield crosstalk between light of the light-transmitting parts 11.

Specifically in the collimating structure above according to the embodiment of the disclosure, the number of the light-transmitting parts 11 in each light-shielding layers 10 is same, and the corresponding light-transmitting parts 11 at the respective light-shielding layer 10 are located at same positions and correspond to each other in a one-to-one manner. The orthographic projections of the light-transmitting parts 11 at the same position in the respective light-shielding layers 10 onto at least one light-transmitting layer 20 overlap with each other as fully as possible, but there is such an alignment error in a real fabrication process that there may be some offset between the light-transmitting parts 11 at same position in the respective light-shielding layers 10, so the light-transmitting parts 11 may overlap partially with each other instead of overlapping fully with each other.

The orthographic projections of the light-transmitting parts 11 at the same position in the respective light-shielding layers 10 onto the light-transmitting layers 20 overlap with each other so that the light-transmitting parts constitute a column-of-holes structure for collimating light incident on the position at respective angles so that light in some range of angles (small angles) from the normal to the surface of the collimating structure can be transmitted through the column-of-holes structure, and light at larger angles than the range of angles (large angles) can be shielded. The difference between the smallest and largest angles at which light can be transmitted is the light convergence angle θ.

Specifically in the collimating structure above according to the embodiment of the disclosure, the collimating structure includes the plurality of light-shielding layers 10 with the light-transmitting parts 11, and the distances between the light-shielding layers 10 are adjusted using the light-transmitting layers 20 to define the distance between the top light-shielding layer 10a and the bottom light-shielding layer 10b and the diameter of the light-transmitting part 11, to thereby achieve a desirable depth-to-width ratio of a column of holes so as to define the light convergence angle θ of the collimating structure for a desirable collimation effect, so that information about a valley and a ridge of a fingerprint can be acquired precisely.

Since a better collimating effect can be achieved by fabricating the plurality of structurally simple light-shielding layers and light-transmitting layers, and the structure of the device is light-weighted and thin, the process difficulty of the device can be lowered. Furthermore the intermediate light-shielding layer 10c is arranged, and the distances between the respective light-shielding layers 10 are adjusted using the light-transmitting layers 20, so that there is no interfering stray light, that is, the intermediate light-shielding layer 10c can shield crosstalk between light of the light-transmitting parts 11 to thereby improve the accuracy of recognized fingerprint information.

In some embodiments of the disclosure, in the collimating structure above, as illustrated in FIG. 2, the light-transmitting parts 11 are light-transmitting holes.

Figure 3:
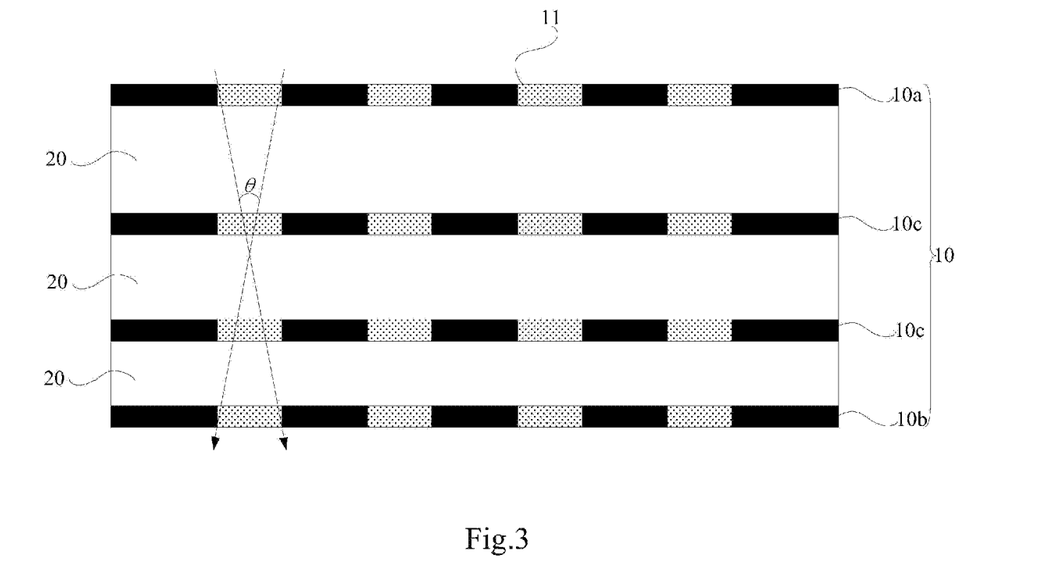
FIG. 3 is a second schematic structural diagram of the collimating structure according to an embodiment of the disclosure.

In some embodiments of the disclosure, in the collimating structure above, as illustrated in FIG. 3, light-transmitting parts 11 are light-transmitting holes filled with a light-transmitting material. The light-transmitting material can fill into the light-transmitting holes to form the light-transmitting parts 11. The light-transmitting parts with filled light-transmitting material can avoid air, water molecules, and other substances from existing in the light-transmitting holes, which would otherwise have resulted in exfoliation of a layer, and also can avoid light from being refracted in the transmitting holes, which would otherwise have resulted in inaccurately recognized information.

In some embodiments of the disclosure, in the collimating structure above, the light-transmitting layers 20 function to adjust the distances between the respective light-shielding layers 10, so in order to make the collimating structure more light-weighted and thinner, all the light-transmitting layers 20 can be located between the top light-shielding layer 10a and the bottom light-shielding layer 10b as illustrated in FIG. 2, that is, the top light-shielding layer 10a and the bottom light-shielding layer 10b are the outermost layers of the collimating structure, so that the number of light-shielding layers 10 is more than the number of light-transmitting layers 20 in the collimating structure. Of course, a light-transmitting layer 20 can alternatively be arranged outside the top light-shielding layer 10a and the bottom light-shielding layer 10b as needed in reality, although the embodiment of the disclosure will not be limited thereto.

Specifically a light-shielding material of the light-shielding parts of the light-shielding layers 10 can be a material absorbing a light wave in some wavelength range, e.g., a material absorbing the visible wavelength range; or the material of the light-shielding parts of the light-shielding layers 10 can be a material absorbing some specific wavelength, e.g., a material absorbing an infrared light wave, although the embodiment of the disclosure will not be limited thereto.

Specifically the materials of the light-transmitting layers 20 and the light-transmitting parts can be light-transmitting materials with a high transmittivity of a light wave in some wavelength range, e.g., materials with a high transmittivity in the visible wavelength range; or the materials of the light-transmitting layers 20 and the light-transmitting parts can be materials with a high transmittivity at some specific wavelength, e.g., materials with a high transmittivity of an infrared light wave, although the embodiment of the disclosure will not be limited thereto.

In some embodiments, the materials of the light-transmitting layers 20 and the light-transmitting parts may be the same material or may be different materials. For example, the light-transmitting layers 20 are made of transparent PI, and the light-transmitting parts are made of $SiO_2$ with a transmittivity up to 99%. Since PI is a flexible material, the fabricated collimating structure can be applicable to a flexible component.

In some embodiments, the light-shielding material of the light-shielding parts of the light-shielding layers 10 can be a BM, and since the BM can not be exposed on the PI material, the BM may remain thereon, thus hindering light transmissive performance of the light-transmitting parts 11. In view of this, optionally in the collimating structure above according to the embodiment of the disclosure, as illustrated in FIG. 4, a light-transmitting layer 20 can include: a first light-transmitting material layer 21, and a second light-transmitting material layer 22 located between the first light-transmitting material layer 21 and a light-shielding layer 10 adjacent to the side thereof facing the top light-shielding layer 10a.

In some embodiments, the materials of the first light-transmitting material layer 21 and the second light-transmitting material layer 22 are different from each other, the thicknesses of the first light-transmitting material layer 21 and the second light-transmitting material layer 22 are different from each other. The second light-transmitting material layer 22 deposited above the first light-transmitting material layer 21 can isolate the first light-transmitting material layer 21 from the light-shielding layer 10 so that the light-shielding layer 10 fabricated on the second light-transmitting material layer 22 can be exposed fully, thus forming the light-transmitting parts 11. For example, the first light-transmitting material layer 21 can be made of transparent PI, and the second light-transmitting material layer 22 can be made of SiO₂ on which a BM can be exposed fully.

Figure 4:
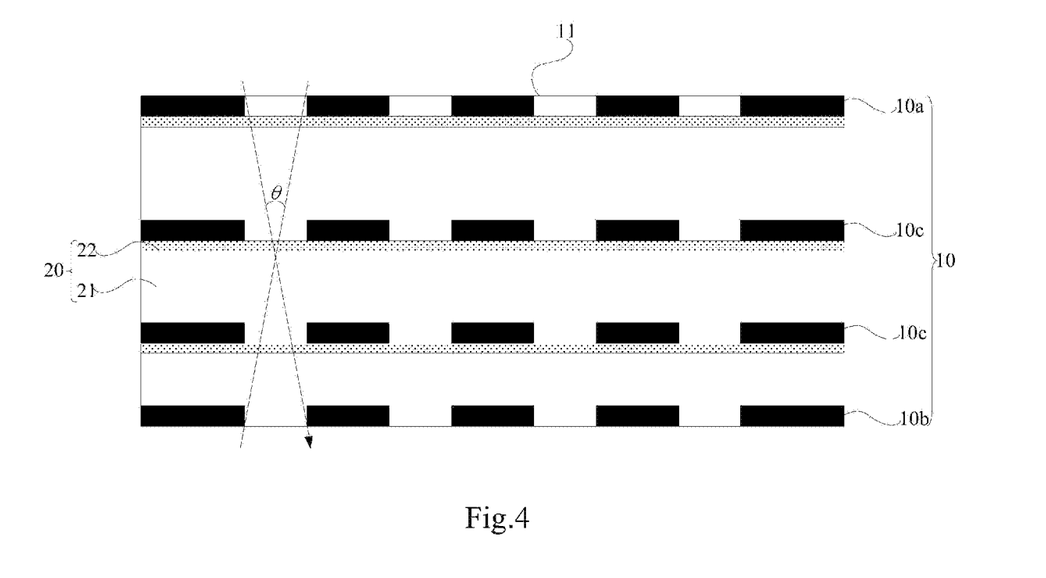
FIG. 4 is a third schematic structural diagram of the collimating structure according to an embodiment of the disclosure.
Figure 5:
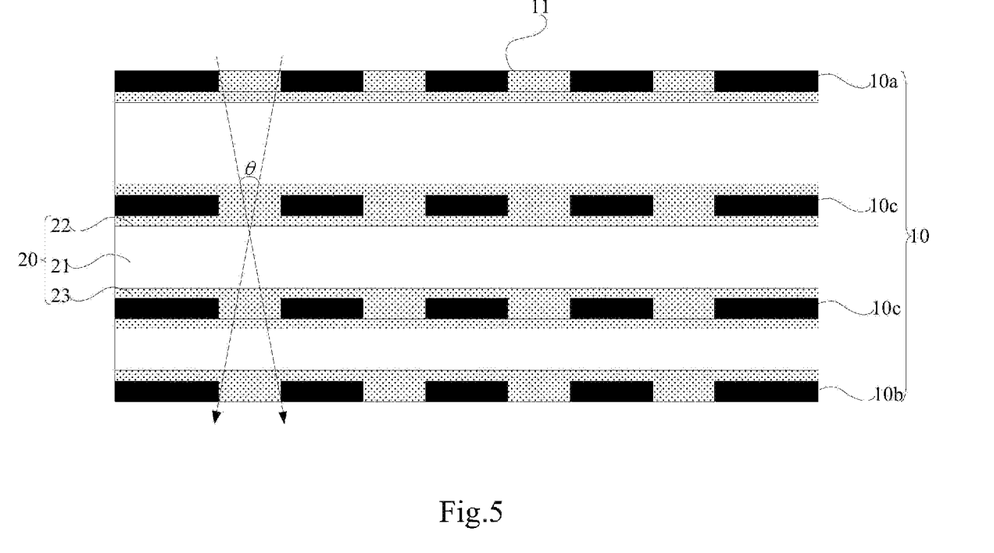
FIG. 5 is a fourth schematic structural diagram of the collimating structure according to an embodiment of the disclosure.

In some embodiments of the disclosure, in the collimating structure above, as illustrated in FIG. 4, the first light-transmitting material layer 21 can be partially filled in the light-transmitting holes to form the light-transmitting parts 11, that is, the light-transmitting parts 11 are made of a transparent PI material. Or as illustrated in FIG. 5, the light-transmitting layer 20 can further include: a third light-transmitting material layer 23 located between the first light-transmitting material layer 21 and a light-shielding layer 10 adjacent to the side of the first light-transmitting material layer 21 facing the bottom light-shielding layer 10b, where the third light-transmitting material layer 23 is partially filled in the light-transmitting holes to form the light-transmitting parts 11, that is, the third light-transmitting material layer 23 located above the light-shielding layer 10 and the light-transmitting parts 11 are formed integrally. For example, the third light-transmitting material layer 23 can be made of SiO₂, of which the light-transmitting parts 11 are made.

Figure 6:
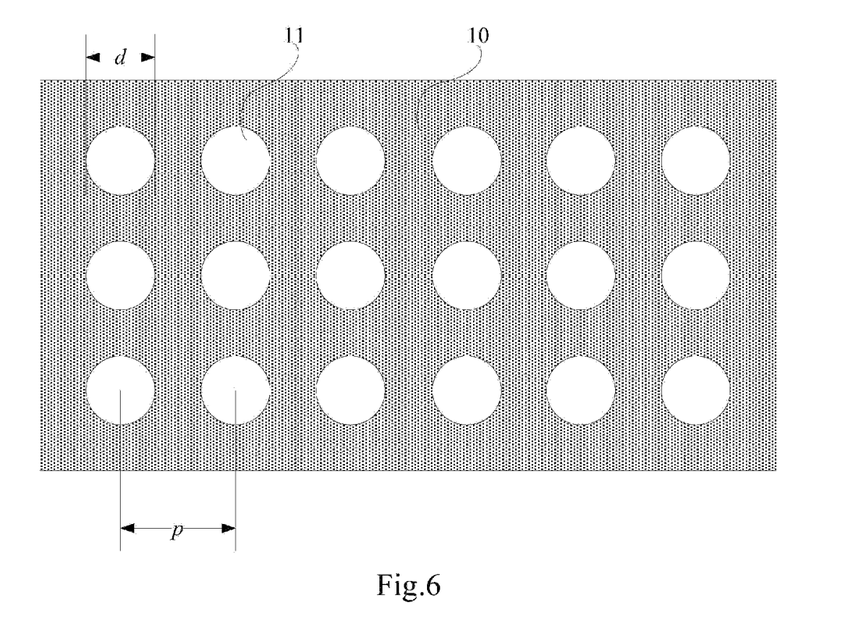
FIG. 6 is a first schematic top view of the collimating structure according to an embodiment of the disclosure.
Figure 7:
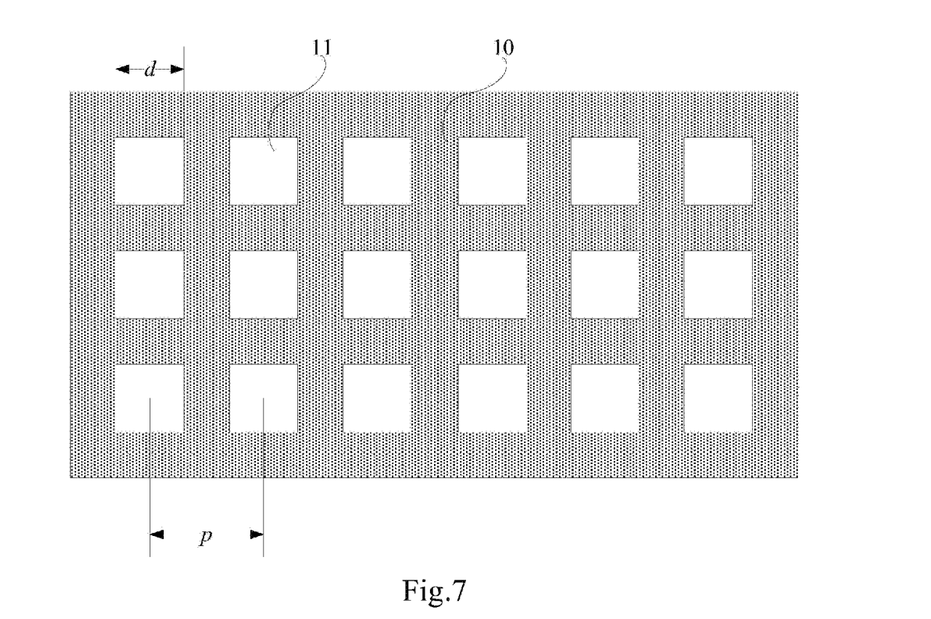
FIG. 7 is a second schematic top view of the collimating structure according to an embodiment of the disclosure.

In some embodiments of the disclosure, in the collimating structure above, the light-transmitting parts 11 in each light-shielding layer 10 are arranged periodically as illustrated in FIG. 6 or FIG. 7, where the shape of the light-transmitting part 11 can be a circular, a square, or another shape, although the embodiment of the disclosure will not be limited thereto. As illustrated in FIG. 6, when the shape of the light-transmitting part 11 is a circular, the diameter d of the light-transmitting part is the diameter of the circular, and the periodicity p thereof is the distance between the centers of two circulars. As illustrated in FIG. 7, when the shape of the light-transmitting part 11 is a square, the diameter d of the light-transmitting part is the length of a side of the square, and the periodicity p thereof is the distance between the centers of two squares.

The design principle and the structure of the collimating structure above according to the embodiment of the disclosure will be described below in details.

Specifically the range of the light convergence angle θ is defined by the thickness H between the outer surface of the top light-emitting layer 10a and the outer surface of the bottom light-emitting layer 10b of the collimating structure, and the diameter d of the light-transmitting part 11, that is, $$\tan\frac{\theta}{2} = d/H.$$

Figure 8:
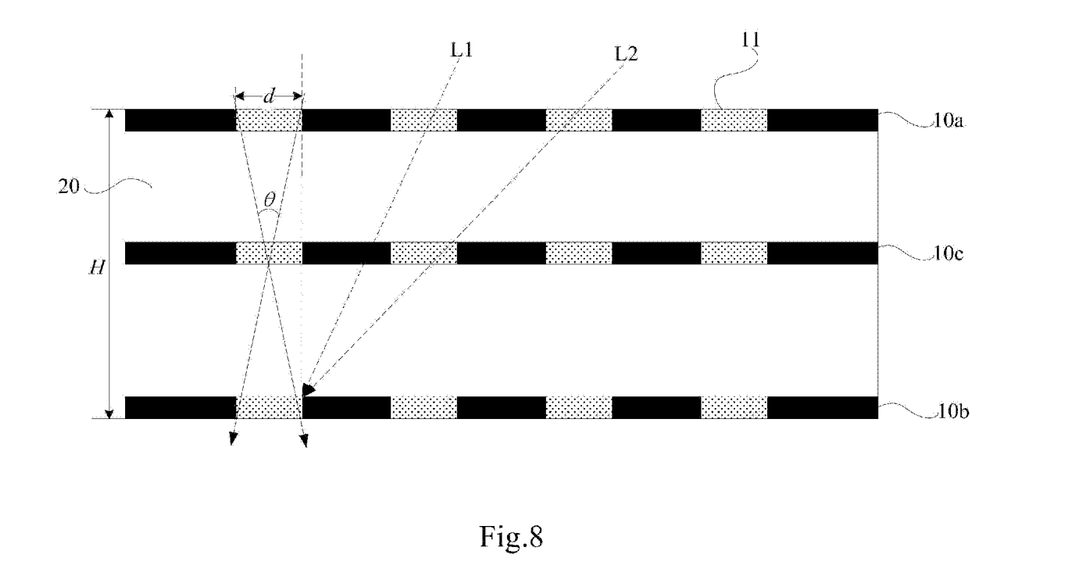
FIG. 8 is a first schematic principle diagram of the collimating structure according to an embodiment of the disclosure.
Figure 9:
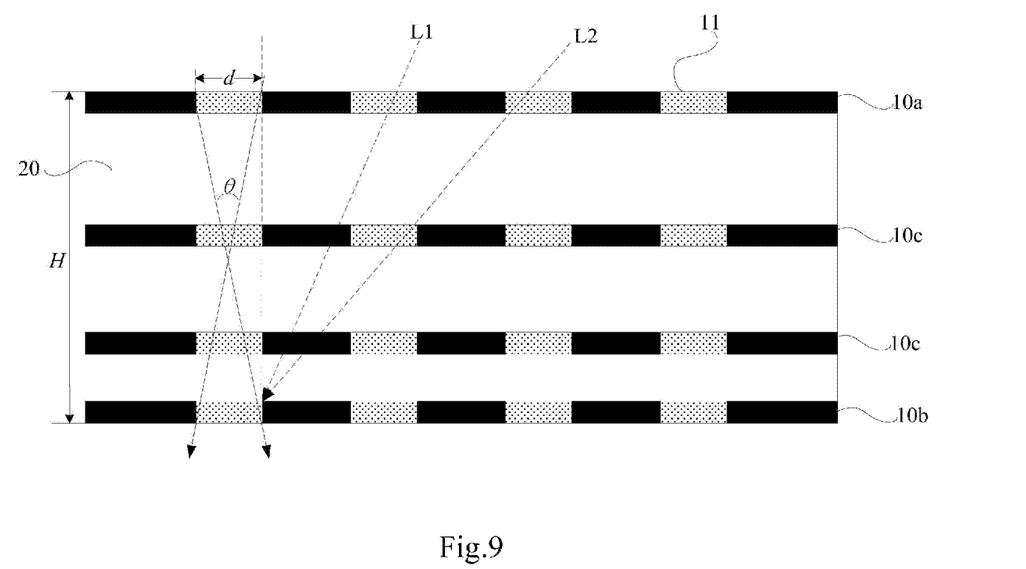
FIG. 9 is a second schematic principle diagram of the collimating structure according to an embodiment of the disclosure.

As illustrated in FIG. 8 and FIG. 9, when a texture is being recognized, a light L1, a light L2, and subsequent light Lm arrive at an optical sensor structure below the collimating structure through the light-transmitting layers 20 so that an acquired image may be blurred, and thus information about the texture may be recognized inaccurately according to the light received by the optical sensor structure. Accordingly the intermediate light-shielding layer 10c needs to be arranged to shield a crosstalk light beam so that light of adjacent light-transmitting parts 11 can be shielded or absorbed by the light-shielding layer, and thus there isn't interfering stray light.

As illustrated in FIG. 8 and FIG. 9, the crosstalk beam can be shielded under such a principle that: as illustrated in FIG. 8, firstly an intermediate light-shielding layer 10c is arranged to firstly shield the light L1, and when the intermediate light-shielding layer 10c is insufficient to shield the light L1, then another intermediate light-shielding layer 10c is further arranged; and thereafter as illustrated in FIG. 9, still another intermediate light-shielding layer 10c is arranged to shield the light L2, and so on until the light Lm can be shielded.

Based on above, in some embodiments of the disclosure, in the collimating structure above, in order to shield more crosstalk light beams, the number of intermediate light-shielding layers 10c is two or more, as illustrated in FIG. 9. The number of intermediate light-shielding layers 10c shall be set in combination with the other parameters, and a repeated description thereof will be omitted here.

In some embodiments of the disclosure, in the collimating structure above, a light-transmitting layer 20 is filled between two adjacent light-shielding layers 10, and in order to control the spacing between any two of light-shielding layers 10, the structural materials and thicknesses of the respective light-shielding layers 10 are typically the same. Optionally as illustrated in FIG. 8 and FIG. 9, the thicknesses of the light-shielding layers 10 are the same for the sake of easy calculation and fabrication. Of course, the thicknesses of the light-shielding layers 10 may alternatively be different, although the embodiment of the disclosure will not be limited thereto.

In some embodiments of the disclosure, in the collimating structure above, as illustrated in FIG. 8 and FIG. 9, the thicknesses of the respective light-transmitting layers 20 are different, and their corresponding thicknesses shall be determined for different shielding. How to determine the thicknesses of the respective light-transmitting layers 20 is described below in details with reference to FIG. 10.

Figure 10:
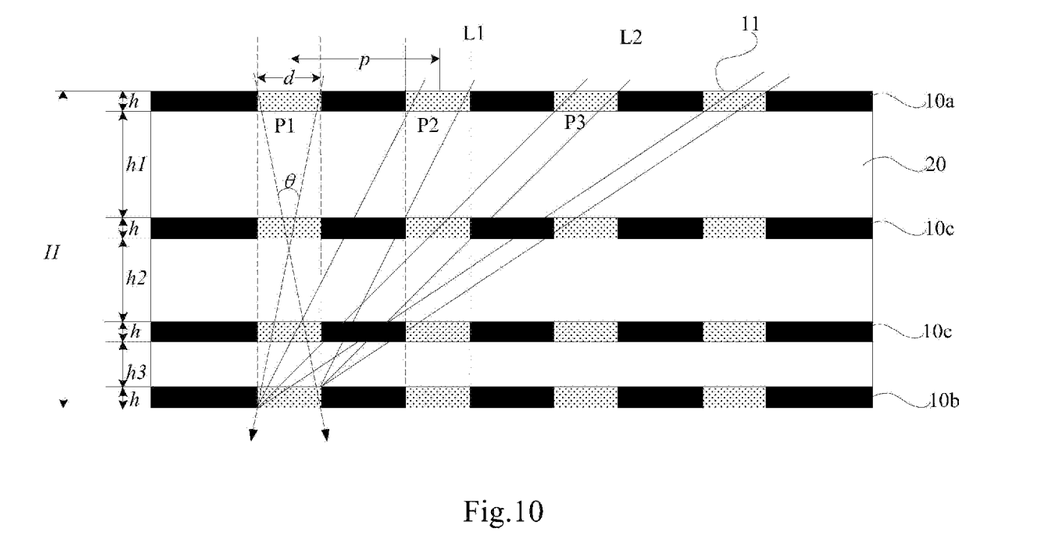
FIG. 10 is a third schematic principle diagram of the collimating structure according to an embodiment of the disclosure.

As illustrated in FIG. 10, the diameter of the light-transmitting part is d, the periodicity of the light-transmitting parts, i.e., the spacing between the centers of the light-transmitting parts are p, the thickness of the light-shielding layer 10 is h, and the thicknesses of N light-transmitting layers 20 are h1, h2, h3, . . . , hN respectively in the direction from the top light-shielding layer 10a to the bottom light-shielding layer 10b. As illustrated in FIG. 9, the light-transmitting layers 20 and the light-shielding layers 10 satisfy the equations of:

$$\tan\frac{\theta}{2} = d/H;$$

$$\sum_{i=1}^{n} h_i \leq \frac{(p-d)+(n-1)p}{np} *(H-h)-(n-1)h; \text{ and}$$

$$(N+1)h + \sum_{i=1}^{N} h_i = H.$$

Where θ represents the light convergence angle of the collimating structure; d represents the diameter of the light-transmitting part 11; p represents the periodicity of the light-transmitting parts 11; H represents the thickness from the outside surface of the top light-shielding layer 10a to the outside surface of the bottom light-shielding layer 10b; h represents the thickness of a light-shielding layer; and $h_i$ represents the thickness of a light-transmitting layer, i=1, . . . , N, and a light-transmitting layer with smaller i is closer to the top light-shielding layer 10a.

Equation $$\sum_{i=1}^{n} h_i \le \frac{(p-d)+(n-1)p}{np} * (H-h) - (n-1)h$$

is obtained as: the intermediate light-shielding layer 10c can shield crosstalk from light of other light-transmitting parts. Take the collimating structure shown in FIG. 10 for example to explain the equation. The light L1 from the adjacent light-transmitting part P2 can be shielded by the intermediate light-shielding layer 10c adjacent to the top shielding layer 10a, and doesn't interfere to the light of the light-transmitting part P1, the light-transmitting layers 20 and the light-shielding layers 10 needs to satisfy $$h1 \le \frac{(p-d)}{p} * (H-h);$$

the light L2 from the light-transmitting part P3 can be shielded by the next intermediate light-shielding layer 10c, and doesn't interfere to the light of the light-transmitting part P1, the light-transmitting layers 20 and the light-shielding layers 10 needs to satisfy $$h1 + h2 \le \frac{(p-d)+p}{2p} * (H-h) - h.$$

And so on, $$\sum_{i=1}^{n} h_i \le \frac{(p-d)+(n-1)p}{np} * (H-h) - (n-1)h$$

is obtained.

Specifically the thickness H from the outside surface of the top light-shielding layer 10a to the outside surface of the bottom light-shielding layer 10b, i.e., the thickness of the collimating structure can be determined according to the smallest light convergence angle θ required to exactly distinguish a valley from a ridge. Thereafter as can be known from the equation above of $$\sum_{i=1}^{n} h_i \le \frac{(p-d)+(n-1)p}{np} * (H-h) - (n-1)h:$$

$$h1 \le \frac{(p-d)}{p} * (H-h);$$

$$h1 + h2 \le \frac{(p-d)+p}{2p} * (H-h) - h;$$

$$h1 + h2 + h3 \le \frac{(p-d)+2p}{3p} * (H-h) - 2h; \ldots \ldots$$

$$h1 + h2 + h3 + \ldots + hN \le \frac{(p-d)+(N-1)p}{Np} * (H-h) - (N-1)h.$$

Based on the above equations above, firstly H can be calculated based on the light convergence angle θ, and the diameter d and the periodicity p of the light-transmitting parts are given, then the thicknesses h1, h2, h3, . . . , hN of the light-transmitting layers 20 can be calculated sequentially in the equations above.

Specifically in a real process, the thicknesses h of the light-shielding layers 10 are far smaller than the thicknesses of the light-transmitting layers 20, so the former can be neglected.

Specifically a luminous flux Q per unit area of a light-shielding layer 10 is the ratio of the total area $S_0$ of the light-transmitting parts 11 to the area A of the light-shielding layer 10, i.e., $Q=S_0/A$. Since the light-transmitting parts 11 in the light-shielding layer 10 are arranged periodically, the luminous flux Q is defined as the proportion of the total area of the light-transmitting part 11 in each periodicity (i.e., a unit area $p^2$). When the shape of the light-transmitting part 11 is a circular, $$Q = \frac{d^2}{4p^2}\pi;$$

and when the shape of the light-transmitting part 11 is a square, $$Q = \frac{d^2}{p^2}.$$

As can be apparent, the luminous flux Q is dependent upon the diameter d of the light-transmitting part 11 and the periodicity p of the light-transmitting parts 11. With the periodicity p of the light-transmitting parts 11, each selected light beam can correspond precisely to a valley or a ridge of a fingerprint in a one-to-one manner; and the luminous flux Q of the collimating structure is determined directly by the diameter d of the light-transmitting part 11, and the lower the luminous flux Q required for an optical sensor structure to response to a light beam of a valley or a ridge is, that is, the higher the sensitivity of the optical sensor structure is, then the smaller the diameter d of the light-transmitting part 11 is.

In some embodiments of the disclosure, in the collimating structure above, as can be apparent from the equations above, the smaller the diameter d of the light-transmitting part 11 is, then the smaller the thickness H of the collimating structure is. For example, when the smallest light convergence angle θ required to exactly distinguish a valley from a ridge is 5.7°, and the diameter d of the light-transmitting part 11 is 6 μm, then the thickness H of the collimating structure from the outer surface of the top light-shielding layer 10a to the outer surface of the bottom light-shielding layer 10b is 42 μm. With the related process, the diameter d of the light-transmitting part 11 can be made approximately 2 μm, so the thickness of the collimating structure can be made approximately 20 μm, thus making the collimating structure more light-weighted and thinner.

In some embodiments of the disclosure, the transmittivity of the collimating structure, i.e., the amount of effective light information which can be received by an optical sensor structure, is taken into account in a real design process. Firstly the luminous flux Q can be determined according to the sensitivity of an optical sensor structure, and the diameter d of the light-transmitting part 11 can be determined for a photosensitive area of the optical sensor structure; and thereafter the periodicity p of the light-transmitting parts 11 can be determined according to the luminous flux Q and the diameter d. Then the thickness H of the collimating structure can be determined according to the diameter d and the smallest light convergence angle θ. Lastly the thicknesses h1, h2, h3, . . . , hN of the respective light-transmitting layers 20 can be calculated sequentially according to the diameter d, the periodicity p, and the thickness H, thus resulting in an anti-crosstalk structure.

Specifically the thickness H of the collimating structure can be controlled at approximately 20 μm according to the sensitivity of the existing light sensor structure, that is, the higher the sensitivity of the light sensor structure is, then the smaller the diameter d is, and the smaller the overall thickness H of the collimating structure is, so the collimating structure can be made thinner. In some embodiments of the disclosure, in the collimating structure above, the thickness H of the collimating structure is generally 100 μm or smaller.

For example, when the diameter d is 6 μm, and thus the thickness H of the collimating structure is 42 μm, then the luminous flux Q is 13% at the periodicity p of 15 μm, and thus four light-shielding layers 10 can shield crosstalk from light of adjacent light-transmitting parts 11; and as can be determined as a result of optical simulation, the numbers of light-shielding layers 10 and light-transmitting layers 20, and their positions can be controlled so that each selected light beam can correspond precisely to a valley or a ridge of a fingerprint in a one-to-one manner, and there isn't other interfering stray light, so the fingerprint can be recognized precisely, and the performance of the structure with the designed parameters can be satisfactory.

In another example, when the diameter d is 6 μm, and thus the thickness H of the collimating structure is 42 μm, then the luminous flux Q is 20% at the shorter periodicity p of 12 μm, that is, the luminous flux Q is increased, and when four light-shielding layers 10 are structurally designed again, then a result of optical simulation may show crosstalk between light, so information about a valley cannot be distinguished from information about a ridge, that is, the four-layer structure cannot provide an anti-crosstalk structure. The calculation above is repeated so that a new anti-crosstalk collimating structure shall include five light-shielding layers 10. As can be determined as a result of optical simulation, the five-layer structure can shield crosstalk between light beams of adjacent light-transmitting parts 11 so that information about a valley can be distinguished from information about a ridge.

In still another example, when the diameter d is 6 μm, and thus the thickness H of the collimating structure is 42 μm, then the luminous flux Q is 35% at the even shorter periodicity p of 9 μm, that is, the luminous flux Q is increased, and when five light-shielding layers 10 are structurally designed again, then a result of optical simulation may show crosstalk between light, so information about a valley cannot be distinguished from information about a ridge, that is, the five-layer structure cannot provide an anti-crosstalk structure. The calculation above is repeated so that a new anti-crosstalk collimating structure shall include seven light-shielding layers 10. As can be determined as a result of optical simulation, the seven-layer structure can shield crosstalk between light beams of adjacent light-transmitting parts 11 so that information about a valley can be distinguished from information about a ridge.

As can be apparent from the examples above, the value of the luminous flux Q shall be improved by designing different anti-crosstalk structures. In the embodiment of the disclosure, a structure with a high luminous flux Q can be designed, and also crosstalk between light can be prevented to thereby recognize information about a valley and a ridge precisely. In some embodiments of the disclosure, in the collimating structure above, when the light-transmitting parts 11 at the light-shielding layers 10 are arranged periodically, when the shorter the periodicity p of the light-transmitting parts 11 is, then the more the number of light-shielding layers 10 is needed. The transmittivity of the collimating structure can be improved by shortening the periodicity p of the light-transmitting parts 11. Furthermore the numbers of light-shielding layers 10 and light-transmitting layers 20, and the thicknesses of the light-transmitting layers 20 can be controlled so that each selected light beam corresponds to a valley or a ridge of a fingerprint, and there will be no other interfering stray light, so that light of all the adjacent light-transmitting parts 11 can be shielded by the light-shielding layers 10.

Based upon the same inventive idea, an embodiment of the disclosure provides a method for fabricating a collimating structure, and since the fabricating method addresses the problem under a similar principle to the collimating structure above, reference can be made to the implementation of the collimating structure for an implementation of the fabricating method, so a repeated description thereof will be omitted here.

Specifically a method for fabricating a collimating structure according to an embodiment of the disclosure includes the following steps.

Forming a plurality of light-shielding layers 10 with the light-transmitting parts 11 and the light-shielding parts, and a plurality of light-transmitting layers 20 alternately on a base substrate, where at least one of the light-shielding layers is formed between every two of the light-transmitting layers, and forming each of the light-transmitting layers 20 includes: forming a first light-transmitting material layer 21 and a second light-transmitting material layer 22 sequentially.

In some embodiments of the disclosure, as illustrated in FIG. 4, the second light-transmitting material layer 22 is located between the first light-transmitting material layer 21 and a light-shielding layer 10 adjacent to the side of the first light-transmitting material layer 21 facing the top light-shielding layer 10a, to isolate the first light-transmitting material layer 21 from the light-shielding layer 10, so that the light-shielding layer 10 fabricated on the second light-transmitting material layer 22 is exposed completely, thus forming the light-transmitting parts 11. For example, the first light-transmitting material layer 21 can be made of transparent PI, and the second light-transmitting material layer 22 can be made of $SiO_2$ on which a light-shielding material BM can be exposed completely, so such a problem will not occur that a BM on PI is exposed incompletely.

In this manner, as illustrated in FIG. 4, the first light-transmitting material layer 21 can be partially filled in the light-transmitting holes to form light-transmitting parts 11, that is, the light-transmitting parts 11 are made of a transparent PI material.

Alternatively in the fabricating method above according to the embodiment of the disclosure, as illustrated in FIG. 5, forming each of the light-transmitting layers 20 can further include: forming a third light-transmitting material layer 23 before the first light-transmitting material layer 21 is formed, that is, the third light-transmitting material layer 23 is located between the first light-transmitting material layer 21 and a light-shielding layer 10 adjacent to the side the first light-transmitting material layer 21 facing the bottom light-shielding layer 10b, and the third light-transmitting material layer 23 is partially filled in the light-transmitting holes to form light-transmitting parts 11, that is, the third light-transmitting material layer 23 located above the light-shielding layer 10 is structured integral to the light-transmitting parts 11. For example, the third light-transmitting material layer 23 can be made of $SiO_2$, of which the light-transmitting parts 11 are made.

Based upon the same inventive idea, an embodiment of the disclosure further provides a display device, which can be a mobile phone, a tablet computer, a TV set, a display, a notebook computer, a digital photo frame, a navigator, or any other product or component with a display function. Reference can be made to the embodiment of the collimating structure above for an implementation of the display device, and a repeated description thereof will be omitted here.

Figure 11:
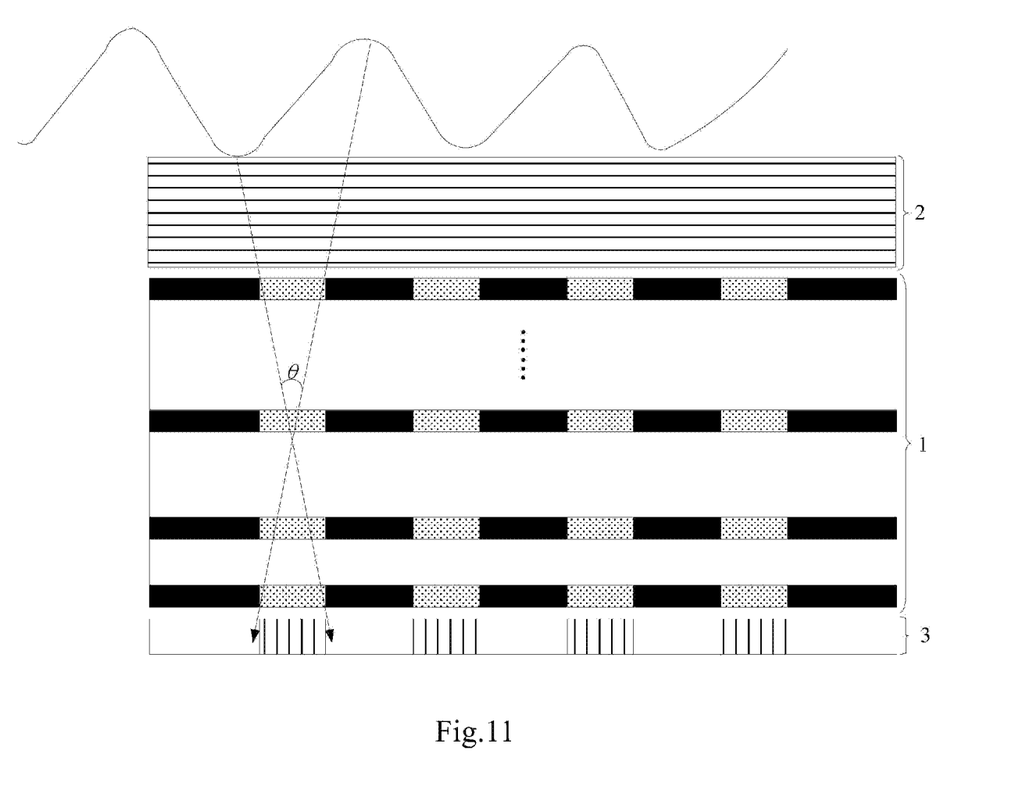
FIG. 11 is a schematic structural diagram of a display device according to an embodiment of the disclosure.

An embodiment of the disclosure provides a display device as illustrated in FIG. 11 including the collimating structure 1 above according to the embodiment of the disclosure, a display panel 2, and an optical sensor structure 3.

The collimating structure 1 is arranged at a surface of the display panel 2 away from a display surface thereof; and the optical sensor structure 3 is arranged at a surface of the collimating structure 1 away from the display panel 2.

In some embodiments, the display surface of the display panel refers to the light-emitting surface of the display panel.

In some embodiments, the collimating structure 1 is configured, when a finger touches the display surface of the display panel, to collimate light reflected by the finger through the light-transmitting parts in the light-shielding layer and the light-transmitting layers; and the optical sensor structure is configured to receive the light collimated by the collimating structure to recognize fingerprint.

In some embodiments, the optical sensor structure 3 includes a plurality of sensors corresponding to the plurality of light-transmitting parts 11 in a one-to-one manner, and when a finger is being recognized, when a finger touches a display screen, the light-shielding layers can select light incident at a small angle by substantially collimating them so that they arrive at the sensors below, and the sensors can detect the strengths of the selected light; and since there are different energies of light diffusively reflected downward by a valley and a ridge, there are different strengths of the light detected by the sensors, so that information about the fingerprint can be acquired.

Specifically the display panel 2 can be an OLED display panel, which can include a protection cover, optical adhesive, a polarizing sheet, a thin film encapsulation component, a cathode, a light-emitting layer, respective functional layers, an OLED base backboard, and other components, for example.

In the collimating structure, the method for fabricating the same, and the display device above according to the embodiments of the disclosure, the collimating structure including the plurality of light-shielding layers with the light-transmitting parts is arranged so that the distances between the respective light-shielding layers are adjusted using the light-transmitting layers to thereby achieve a desirable depth-to-width ratio of a column of holes, so as to define the light convergence angle of the collimating structure. Since a better collimating effect can be achieved by fabricating the plurality of structurally simple light-shielding layers and light-transmitting layers, and the structure of the device is light-weighted and thin, the process difficulty of the device can be lowered. Furthermore at least one intermediate light-shielding layer between the top light-shielding layer and the bottom light-shielding layer is arranged, and the distances between the respective light-shielding layers are adjusted using the light-transmitting layers, so that crosstalk between light of the light-transmitting parts can be shielded to thereby improve the accuracy of recognized texture information.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:
1. A collimating structure, comprising:
a plurality of light-shielding layers and a plurality of light-transmitting layers stacked, and at least one of the light-shielding layers is arranged between every two of the light-transmitting layers, wherein:
the light-shielding layer comprises a plurality of light-transmitting parts and a plurality of light-shielding parts, and the plurality of light-transmitting parts in each light-shielding layer correspond to the light-transmitting parts in other light-shielding layers in one-to-one manner, and orthographic projections of the light-transmitting parts in each light-shielding layer onto at least one light-transmitting layer overlap with orthographic projections of the light-transmitting parts in other light-shielding layers onto the at least one light-transmitting layer; and
the light-shielding layers comprises: a top light-shielding layer, a bottom light-shielding layer, and at least one intermediate light-shielding layer located between the top light-shielding layer and the bottom light-shielding layer; the top light-shielding layer and the bottom light-shielding layer are configured to define a light convergence angle of the collimating structure; and the intermediate light-shielding layer is configured to shield crosstalk between light of the plurality of the light-transmitting parts;
wherein the light-transmitting parts are light-transmitting holes filled with a light-transmitting material;
wherein the light-transmitting layer comprises: a first light-transmitting material layer, a second light-transmitting material layer located between the first light-transmitting material layer and one of the light-shielding layers adjacent to a side of the first light-transmitting material facing the top light-shielding layer, and a third light-transmitting material layer located between the first light-transmitting material layer and one of the light-shielding layers adjacent to a side of the first light-transmitting material layer facing the bottom light-shielding layer; and the third light-transmitting material layer is partially filled in the light-transmitting holes to form the light-transmitting parts.

2. The collimating structure according to claim 1, wherein the light-transmitting parts are light-transmitting holes.

3. The collimating structure according to claim 1, wherein all the light-transmitting layers are located between the top light-shielding layer and the bottom light-shielding layer.

4. The collimating structure according to claim 1, wherein thicknesses of the plurality of light-transmitting layers are different.

5. The collimating structure according to claim 1, wherein thicknesses of the plurality of light-shielding layers are the same.

6. The collimating structure according to claim 1, wherein the light-transmitting parts in the light-shielding layer are arranged periodically, and the smaller the periodicity of the light-transmitting parts is, the larger the number of the light-shielding layers is.

7. The collimating structure according to claim 1, wherein the smaller the diameter of the light-transmitting parts is, the smaller the thickness of the collimating structure is.

8. The collimating structure according to claim 1, wherein a thickness of the collimating structure is smaller than or equal to 100 μm.

9. The collimating structure according to claim 1, wherein the number of intermediate light-shielding layers is more than or equal to two.

10. The collimating structure according to claim 1, wherein the light-transmitting layers and the light-shielding layers satisfy the equations of:

$$\tan\frac{\theta}{2} = d/H;$$

$$\sum_{i=1}^{n} h_i \le \frac{(p-d)+(n-1)p}{np} *(H-h)-(n-1)h; \text{ and}$$

$$(N+1)h + \sum_{i=1}^{N} h_i = H;$$

wherein θ represents the light convergence angle of the collimating structure; d represents a diameter of each of the light-transmitting parts; p represents a periodicity of the light-transmitting parts; H represents a thickness from an outside surface of the top light-shielding layer to an outside surface of the bottom light-shielding layer; h represents a thickness of each of the light-shielding layers; and $h_i$ represents a thickness of the light-transmitting layer, i=1, ..., N, and the light-transmitting layer with smaller i is closer to the top light-shielding layer.

11. The collimating structure according to claim 1, wherein the orthographic projections of the plurality of light-transmitting parts in each of the light-shielding layer onto at least one light-transmitting layer fully overlap with the orthographic projections of the plurality of light-transmitting parts in other light-shielding layers onto at least one light-transmitting layer.

12. A display device, comprising the collimating structure according to claim 1, a display panel, and an optical sensor structure, wherein:
   the collimating structure is arranged at a surface of the display panel away from a display surface thereof; and
   the optical sensor structure is arranged at a surface of the collimating structure away from the display panel.

13. The display panel according to claim 12, wherein the collimating structure is configured, when a finger touches the display surface of the display panel, to collimate light reflected by the finger through the light-transmitting parts in the light-shielding layers and the light-transmitting layers; and the optical sensor structure is configured to receive the light collimated by the collimating structure to recognize fingerprint.

14. The display panel according to claim 12, wherein the optical sensor structure comprises a plurality of optical sensors corresponding to the plurality of light-transmitting parts in one-to-one manner.

15. A method for fabricating a collimating structure, comprising:
   forming a plurality of light-shielding layers with light-transmitting parts and light-shielding parts and a plurality of light-transmitting layers alternately on a base substrate, wherein at least one of the light-shielding layers is formed between every two of the light-transmitting layers, and forming each of the light-transmitting layers comprises: forming a first light-transmitting material layer and a second light-transmitting material layer sequentially;
   forming a third light-transmitting material layer before forming the first light-transmitting material layer.

* * * * *